United States Patent
Chen et al.

(10) Patent No.: US 11,909,059 B2
(45) Date of Patent: Feb. 20, 2024

(54) BATTERY BOX

(71) Applicant: CONTEMPORARY AMPEREX TECHNOLOGY CO., LIMITED, Ningde (CN)

(72) Inventors: Tianming Chen, Ningde (CN); Zhiming Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 616 days.

(21) Appl. No.: 17/112,803

(22) Filed: Dec. 4, 2020

(65) Prior Publication Data

US 2021/0091437 A1 Mar. 25, 2021

Related U.S. Application Data

(63) Continuation of application No. PCT/CN2020/101483, filed on Jul. 10, 2020.

(30) Foreign Application Priority Data

Aug. 14, 2019 (CN) .......................... 201910748287.9

(51) Int. Cl.
*H01M 50/233* (2021.01)
*C09J 7/38* (2018.01)
(Continued)

(52) U.S. Cl.
CPC .............. *H01M 50/233* (2021.01); *C09J 7/10* (2018.01); *C09J 7/38* (2018.01); *C09J 7/385* (2018.01);
(Continued)

(58) Field of Classification Search
CPC ......... H01M 10/6551; H01M 10/6552; H01M 10/6556; H01M 10/653; H01M 50/103;
(Continued)

(56) References Cited

U.S. PATENT DOCUMENTS 5,061,549 A 10/1991 Shores
10,403,869 B2 9/2019 Tyler et al.
(Continued)

FOREIGN PATENT DOCUMENTS

CN 1218302 A 6/1999
CN 2842750 Y 11/2006
(Continued)

OTHER PUBLICATIONS

Ningder Age New Energy Technology Co. Ltd., First Office Action, CN201910748287.9, dated May 28, 2021, 22 pgs.
(Continued)

*Primary Examiner* — Matthew W Van Oudenaren
(74) *Attorney, Agent, or Firm* — Kilpatrick Townsend & Stockton LLP (57) ABSTRACT

This application discloses a battery box, including a battery case and a plurality of batteries accommodated in the battery case. The batteries are bonded to an inner wall of the battery case by using an adhesive, a coefficient of thermal expansion of the adhesive is $\alpha$ in units of ppm/° C., a coefficient of thermal conductivity of the adhesive is $\beta$ in units of W/mK, and a ratio of $\alpha$ and $\beta$ meet a relation of $15 \leq \alpha/\beta \leq 80$. In the battery box in this application, the battery case and the plurality of batteries accommodated in the battery case are bonded by using the adhesive. When the coefficient of thermal conductivity of the adhesive matches the coefficient of thermal expansion, heat conduction requirements of the battery box can be satisfied, and the adhesive can also be prevented from cracking or peeling off under heat stress due to alternating temperatures during use of the battery box, thereby improving safety performance of the battery box.

17 Claims, 8 Drawing Sheets

(51) Int. Cl.
*C09J 7/10* (2018.01)
*H01M 50/209* (2021.01)
*H01M 50/264* (2021.01)
*H01M 50/229* (2021.01)
*H01M 50/271* (2021.01)
*C09J 11/04* (2006.01)
*C09K 5/14* (2006.01)

(52) U.S. Cl.
CPC ............ *C09J 11/04* (2013.01); *C09K 5/14* (2013.01); *H01M 50/209* (2021.01); *H01M 50/229* (2021.01); *H01M 50/264* (2021.01); *H01M 50/271* (2021.01); *C09J 2203/33* (2013.01); *C09J 2301/408* (2020.08); *C09J 2433/00* (2013.01); *C09J 2463/00* (2013.01); *C09J 2475/00* (2013.01)

(58) Field of Classification Search
CPC .......... H01M 50/105; H01M 50/1245; H01M 50/131–136; H01M 50/166; H01M 50/171; H01M 50/19–198; H01M 50/20; H01M 50/204; H01M 50/209; H01M 50/211; H01M 50/233–242; H01M 50/271–282; H01M 50/202
See application file for complete search history.

(56) References Cited

U.S. PATENT DOCUMENTS

| | | | |
|---|---|---|---|
| 10,700,317 | B2 | 6/2020 | Tyler et al. |
| 2002/0164441 | A1* | 11/2002 | Amine ................. B32B 15/043 428/35.2 |
| 2011/0290468 | A1* | 12/2011 | Nakayama ............. C09J 133/08 252/79 |
| 2013/0260220 | A1* | 10/2013 | Ahn ................... H01M 50/1245 429/164 |
| 2016/0301045 | A1 | 10/2016 | Tyler et al. |
| 2016/0301046 | A1 | 10/2016 | Tyler et al. |
| 2016/0301117 | A1* | 10/2016 | Tyler ................. H01M 10/6554 |
| 2019/0386296 | A1 | 12/2019 | He et al. |
| 2020/0295325 | A1 | 9/2020 | Tyler et al. |

FOREIGN PATENT DOCUMENTS

| | | | |
|---|---|---|---|
| CN | 101036250 | A | 9/2007 |
| CN | 102127382 | A | 7/2011 |
| CN | 102339963 | * | 2/2012 |
| CN | 102339963 | A | 2/2012 |
| CN | 202159717 | U | 3/2012 |
| CN | 202685980 | U | 1/2013 |
| CN | 102916146 | A | 2/2013 |
| CN | 104157803 | A | 11/2014 |
| CN | 104577253 | A | 4/2015 |
| CN | 206505964 | U | 9/2017 |
| CN | 206558566 | U | 10/2017 |
| CN | 107408650 | A | 11/2017 |
| CN | 107785512 | A | 3/2018 |
| CN | 107805473 | A | 3/2018 |
| CN | 107887651 | A | 4/2018 |
| CN | 107925022 | A | 4/2018 |
| CN | 207217622 | U | 4/2018 |
| CN | 207664130 | U | 7/2018 |
| CN | 208939045 | U | 6/2019 |
| CN | 209104196 | U | 7/2019 |
| CN | 209104235 | U | 7/2019 |
| CN | 209183608 | U | 7/2019 |
| CN | 209200028 | U | 8/2019 |
| EP | 2696389 | * | 2/2014 |
| EP | 2696389 | A1 | 2/2014 |
| EP | 3284124 | A1 | 10/2016 |
| EP | 3214670 | A2 | 9/2017 |
| JP | 2001202939 | A | 7/2001 |
| JP | 2013125617 | A | 6/2013 |
| JP | 2014063685 | A | 4/2014 |
| JP | 2016058260 | A | 4/2016 |
| JP | 2016162530 | A | 9/2016 |
| JP | 2018510463 | A | 4/2018 |
| JP | 2018522373 | A | 8/2018 |
| JP | 6412456 | B2 | 10/2018 |
| JP | 2019033055 | A | 2/2019 |
| JP | 2019079813 | A | 5/2019 |
| JP | 2019106319 | A | 6/2019 |
| JP | 2019133755 | A | 8/2019 |
| KR | 20180133729 | A | 6/2017 |
| WO | WO2016167873 | A1 | 10/2016 |
| WO | WO2018061738 | A1 | 4/2018 |

OTHER PUBLICATIONS

Ningder Age New Energy Technology Co. Ltd., Second Office Action, CN201910748287.9, dated Aug. 19, 2021, 20 pgs.
Contemporary Amperex Technology Co., Limited, Extended European Search Report, EP20819607.1, dated Aug. 26, 2021, 9 pgs.
Contemporary Amperex Technology, Co., Limited, International Search Report and Written Opinion, PCT/CN2020/101483, dated Sep. 30, 2020, 16 pgs.
Fang, Electrochemical energy storage devices and key materials: Section 5.4 Soft-pack lithium-ion battery and aluminum-plastic film, Metallurgical Industry Press, Jul. 31, 2019, 92-93, 5 pgs.
Notice of Reasons for Refusal, JP2021-550254, dated Oct. 3, 2022, 8 pgs.
Second Office Action received in the corresponding Japanese Application 2021-550254, dated Mar. 23, 2023.

* cited by examiner

BATTERY BOX

CROSS REFERENCE TO RELATED APPLICATIONS

This application is a continuation application of PCT Patent Application No. PCT/CN2020/101483, entitled "BATTERY BOX" filed on Jul. 10, 2020, which claims priority to Chinese Patent Application No. 201910748287.9, filed with the State Intellectual Property Office of the People's Republic of China on Aug. 14, 2019, and entitled "BATTERY BOX", all of which are incorporated herein by reference in their entirety.

TECHNICAL FIELD

This application relates to the technical field of batteries, and in particular, to a battery box with better safety performance.

BACKGROUND

In recent years, with continuous development and popularization of new energy vehicles, battery boxes gradually gain widespread attention and application. Generally, a battery box is composed of a battery case and a plurality of batteries accommodated in the battery case.

In related technologies, the battery case and the batteries are usually bonded by using an adhesive to improve overall energy density of the battery box. However, it is found during actual application that, in a case in which heat conduction requirements of the battery box are satisfied, the battery box and the batteries may be exposed to alternating temperatures in an actual working process and the adhesive is prone to cracking or peeling off under heat stress, which affects the safety performance of the battery box.

In view of this, a battery box with ideal safety performance needs to be proposed.

SUMMARY

Inventors of this application discover through researches and experiments that safety performance of a battery box is closely related to a coefficient of thermal expansion and a coefficient of thermal conductivity of an adhesive. When the coefficient of thermal conductivity of the adhesive matches the coefficient of thermal expansion, heat conduction requirements of the battery box can be satisfied, and the adhesive can also be prevented from cracking or peeling off under heat stress due to alternating temperatures during use of the battery box.

Based on the foregoing discovery, an invention objective of this application is to provide a battery box with ideal safety performance.

To achieve the foregoing invention objective, this application provides a battery box, including a battery case and a plurality of batteries accommodated in the battery case. The batteries are bonded to an inner wall of the battery case by using an adhesive, a coefficient of thermal expansion of the adhesive is $\alpha$ in units of ppm/° C., a coefficient of thermal conductivity of the adhesive is $\beta$ in units of W/mK, and a ratio of $\alpha$ and $\beta$ meet a relation of $15 \leq \alpha/\beta \leq 80$.

As an improvement to the battery box in this application, the coefficient of thermal expansion $\alpha$ and the coefficient of thermal conductivity $\beta$ of the adhesive meet a relation of $25 \leq \alpha/\beta \leq 45$, where the coefficient of thermal expansion $\alpha$ is in units of ppm/° C. and the coefficient of thermal conductivity $\rho$ is in units of W/mK. As an improvement to the battery box in this application, the coefficient of thermal expansion $\alpha$ of the adhesive is 30 ppm/° C. to 55 ppm/° C. and preferably 30 ppm/° C. to 45 ppm/° C. The coefficient of thermal conductivity $\rho$ of the adhesive is 0.6 W/mK to 1.9 W/mK and preferably 0.8 W/mK to 1.5 W/mK.

As an improvement to the battery box in this application, the adhesive contains a substrate and a filler.

As an improvement to the battery box in this application, the substrate is any one of polyurethane, acrylic acid, and epoxy resin, and a percentage of the substrate in the adhesive by weight is 30% to 90% and preferably 40% to 60%. The filler is aluminum oxide or boron nitride, and a percentage of the filler in the adhesive by weight is 10% to 70% and preferably 30% to 50%.

As an improvement to the battery box in this application, a particle size of the filler is 10 micrometers to 80 micrometers.

As an improvement to the battery box in this application, a thickness of the adhesive is 0.5 millimeters to 1.5 millimeters.

As an improvement to the battery box in this application, each battery is a soft package battery, the soft package battery includes an electrode assembly, a package film, and an electrode lead, the electrode assembly is packaged in the package film, and the electrode lead is connected to the electrode assembly and extends from the package film.

As an improvement to the battery box in this application, each battery is a hard shell battery, the hard shell battery includes a battery housing, an electrode assembly, and a battery top cover, the electrode assembly is accommodated in the battery housing, the battery top cover is hermetically connected to the battery housing, an electrode terminal is disposed on the battery top cover, and the electrode terminal is electrically connected to the electrode assembly.

As an improvement to the battery box in this application, the battery housing is made of a metal material, and an outer surface of the battery housing is wrapped with an insulation film.

As an improvement to the battery box in this application, the outer surface of the battery housing includes a first surface, an opening is provided in the insulation film, and at least a portion of the first surface is exposed from the insulation film through the opening and bonded to the inner wall of the battery case by using the adhesive.

As an improvement to the battery box in this application, an area of the opening of the insulation film is A1, an area of the first surface is A2, and a ratio of A1 to A2 meets $30\% \leq A1/A2 \leq 80\%$.

As an improvement to the battery box in this application, the battery housing is made of a metal material, and an outer surface of the battery housing is coated with an insulation coating.

As an improvement to the battery box in this application, the battery case includes a lower case and a box cover that is hermetically connected to the lower case; and the batteries are bonded to an inner wall of the lower case by using the adhesive, and/or the batteries are bonded to an inner wall of the box cover by using the adhesive.

As an improvement to the battery box in this application, the lower case includes a base plate and a side plate that encloses a periphery of the base plate, and the batteries are bonded to the base plate of the lower case by using the adhesive.

As an improvement to the battery box in this application, the lower case further includes a fixing plate, the fixing plate is fixedly connected to the base plate or the side plate, and the batteries are bonded to the fixing plate of the lower case by using the adhesive.

As an improvement to the battery box in this application, a fluid passage is provided in the fixing plate, and the fluid passage contains a heat transfer fluid.

As an improvement to the battery box in this application, the box cover includes a top plate and a surrounding plate that encloses a periphery of the top plate, and the batteries are bonded to the top plate of the box cover by using the adhesive.

This application further provides an apparatus, including the battery box provided in any one of the foregoing embodiments, and the battery box is configured to supply electric energy.

In the battery box in this application, the battery case and the plurality of batteries accommodated in the battery case are bonded by using the adhesive, and the adhesive contains the substrate and filler. A large coefficient of thermal conductivity of the adhesive indicates a high content of the filler in the adhesive and correspondingly a low content of the substrate. In this case, although heat conduction performance is good, the adhesive cracks or peels under heat stress due to alternating temperatures during use of the battery box. A large coefficient of thermal expansion of the adhesive indicates a high content of the substrate in the adhesive and correspondingly a low content of the filler. In this case, although thermal expansion performance is good, heat conduction requirements of the battery box can hardly be met. In the battery box in this application, when the coefficient of thermal conductivity of the adhesive matches the coefficient of thermal expansion, heat conduction requirements of the battery box can be satisfied, and the adhesive can also be prevented from cracking or peeling off under heat stress due to alternating temperatures during use of the battery box, thereby improving safety performance of the battery box.

BRIEF DESCRIPTION OF DRAWINGS

The following describes in detail a battery box in this application and technical effects thereof with reference to accompanying drawings and specific implementations.

REFERENCE NUMERALS 10. battery case, 100. lower case, 102. box cover, 104. seal ring, 106. base plate, 108. side plate, 110. top plate, 112. surrounding plate, 114. fixing plate, 20. batteries, 200. battery housing, 202. electrode assembly, 204. battery top cover, 206. electrode terminal, 208. first surface, 210. insulation film, 212. opening, 300. package film, 304. electrode lead, 40. adhesive.

DESCRIPTION OF EMBODIMENTS

To make the objectives, technical solutions, and technical effects of this application clearer, the following further describes this application in detail with reference to the accompanying drawings and specific implementations. It should be understood that the specific implementations described in this specification are merely intended to explain this application and are not intended to limit this application.

Figure 1:
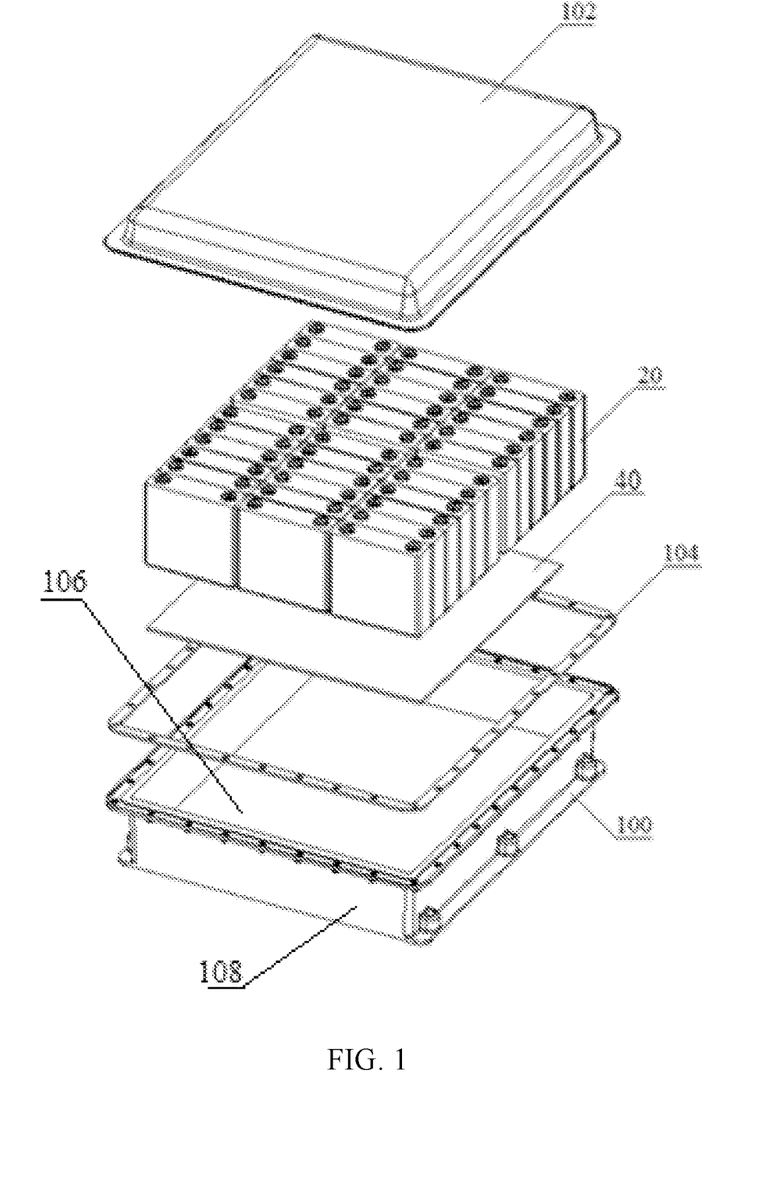
FIG. 1 is a three-dimensional schematic exploded view of a first implementation of a battery box according to this application.
Figure 2:
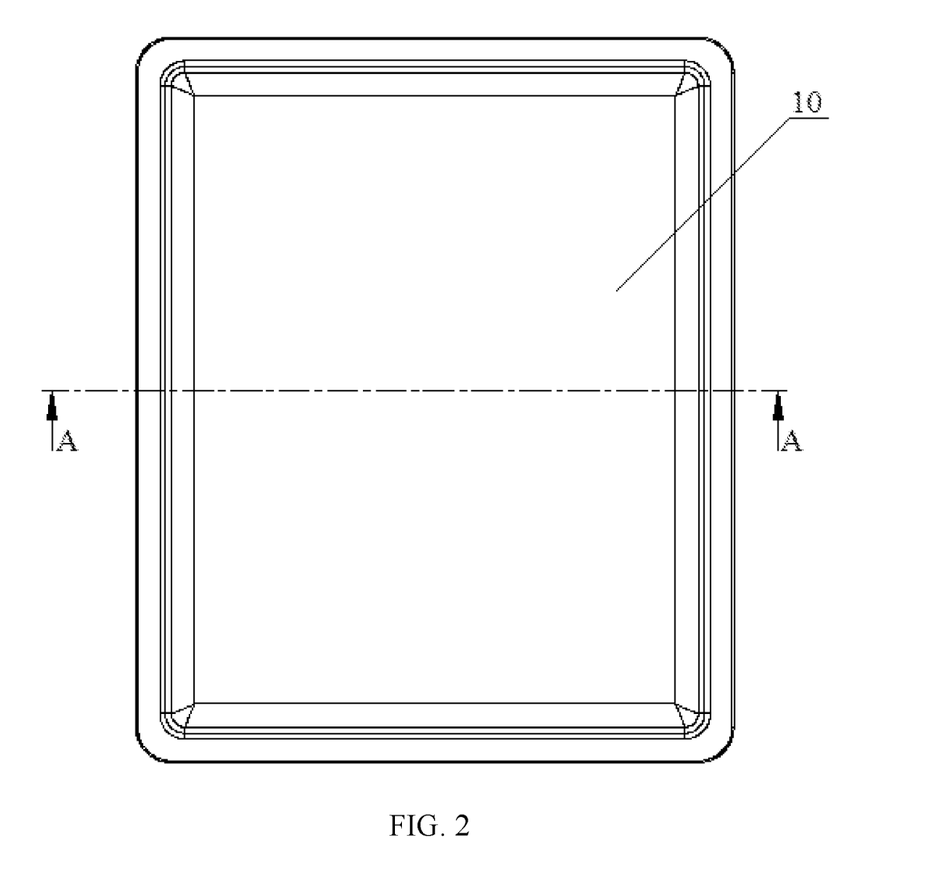
FIG. 2 is a schematic assembly diagram of the first implementation of the battery box according to this application.
Figure 3:
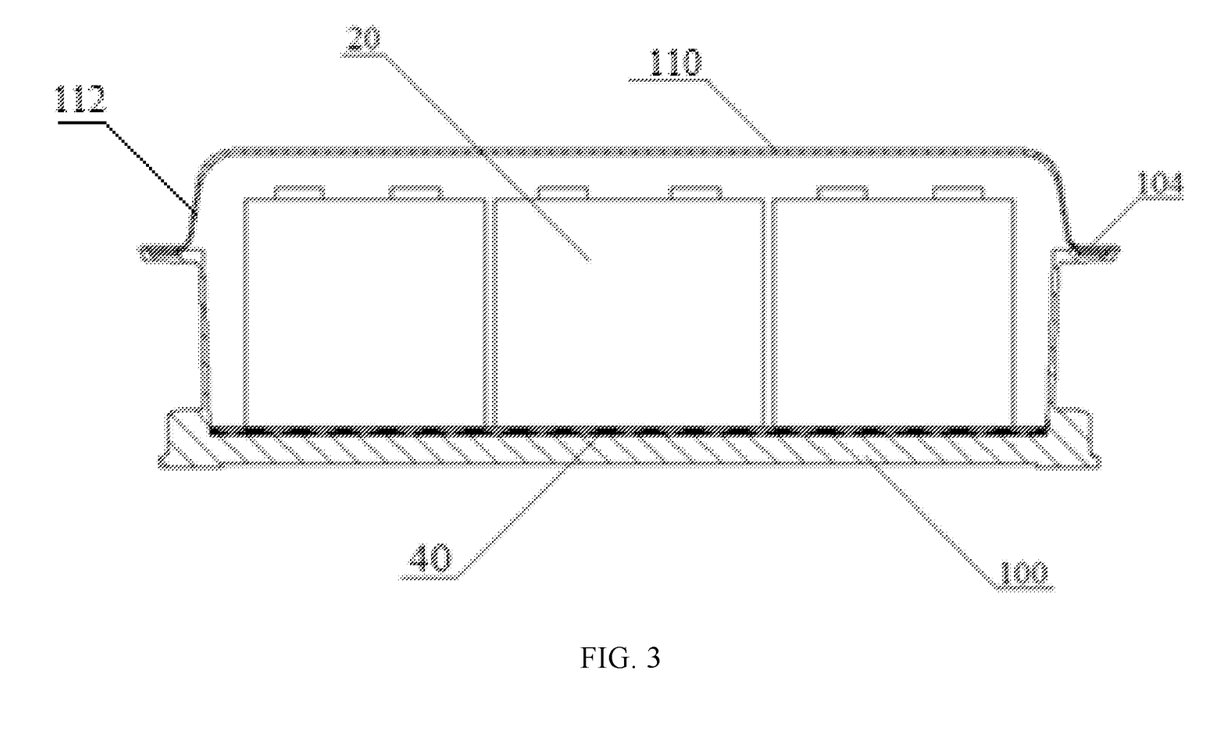
FIG. 3 is a schematic diagram of an A-A cross section of the battery box shown in FIG. 2.

Referring to FIG. 1 to FIG. 3, a first implementation of a battery box in this application includes a battery case 10 and a plurality of batteries 20 accommodated in the battery case 10. The batteries 20 are bonded to an inner wall of the battery case 10 by using an adhesive 40, a coefficient of thermal expansion of the adhesive 40 is $\alpha$ in units of ppm/°C., a coefficient of thermal conductivity of the adhesive 40 is $\beta$ in units of W/mK, and $\alpha$ and $\beta$ meet a relation of $15 \leq \alpha/\beta \leq 80$ and preferably $25 \leq \alpha/\beta \leq 45$.

The battery case 10 includes a lower case 100 and a box cover 102 that is installed on the lower case 100. The lower case 100 and the box cover 102 are sealed by using a seal ring 104. The lower case 100 includes a base plate 106 and a side plate 108 that encloses a periphery of the base plate 106. The box cover 102 includes a top plate 110 and a surrounding plate 112 that encloses a periphery of the top plate 102.

In the first implementation of this application, the batteries 20 are bonded to an inner wall (the base plate 106) of the lower case 100 by using the adhesive 40. Based on an actual requirement, the batteries 20 may alternatively be bonded to an inner wall (the top plate 110) of the box cover 102 by using the adhesive 40.

Figure 4:
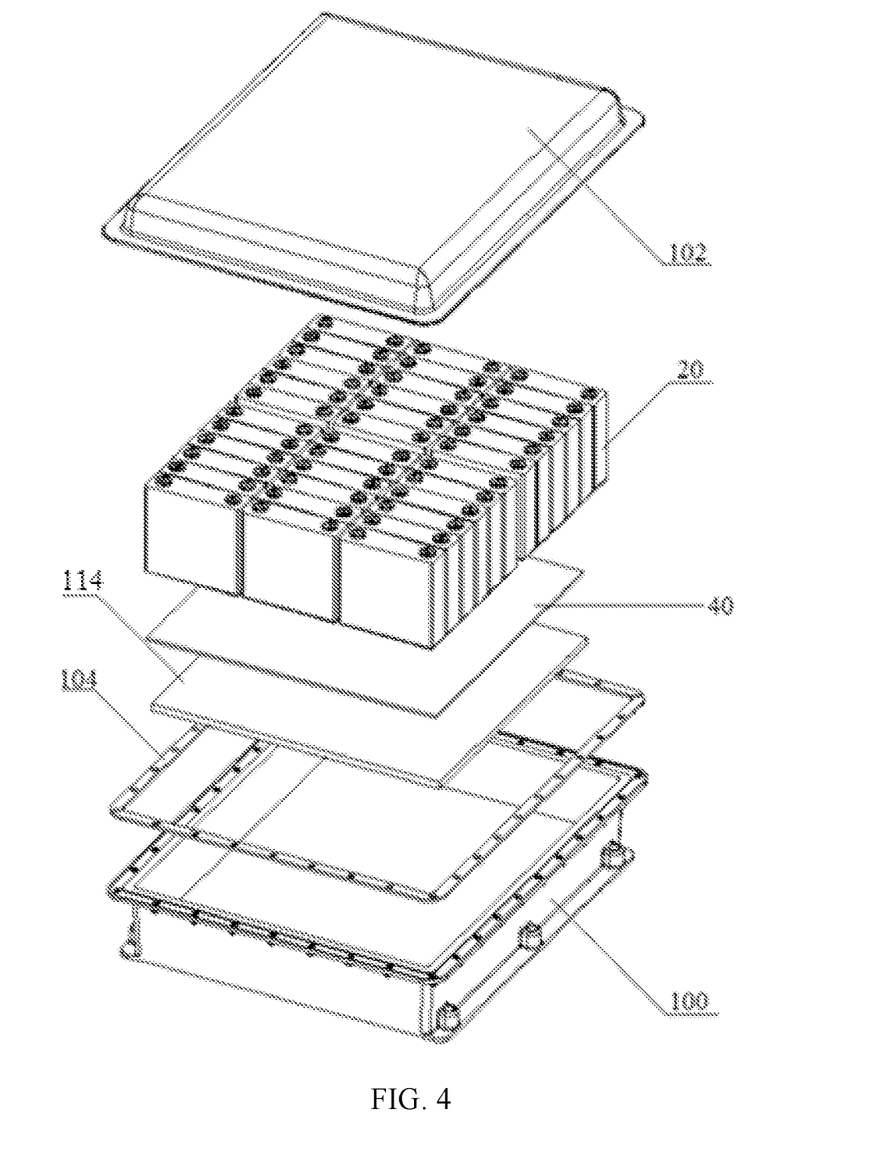
FIG. 4 is a three-dimensional schematic exploded view of a second implementation of a battery box according to this application.
Figure 5:
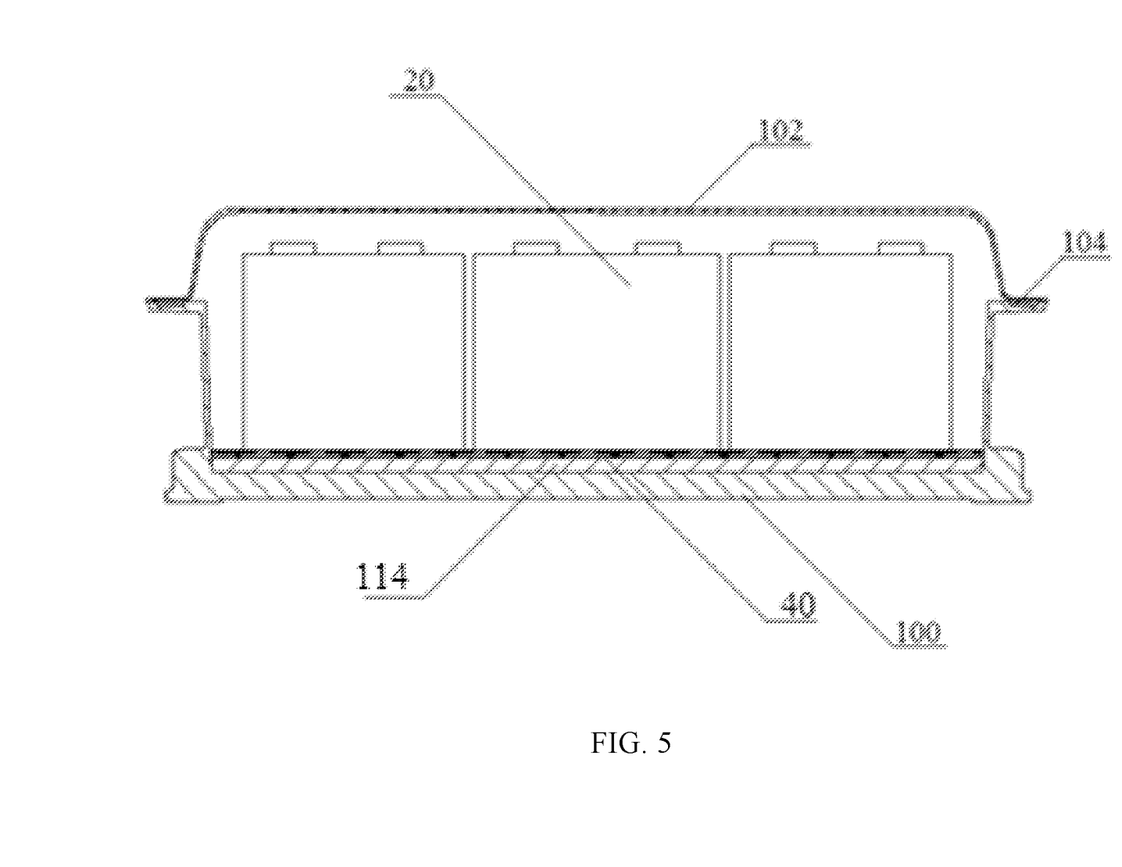
FIG. 5 is a schematic cross-sectional view of the second implementation of the battery box after assembly according to this application.

FIG. 4 and FIG. 5 show a second implementation of a battery box according to this application. Different from the first implementation of this application in which the batteries 20 are directly bonded to the base plate 106 of the lower case 100 of the battery case 10 by using the adhesive 40, in the second implementation of this application, a fixing plate 114 is disposed on the base plate 106 of the lower case 100 of the battery case 10. Disposition of the fixing plate 114 is intended to facilitate disassembly. The fixing plate 114 is fixedly connected to the base plate 106 or the side plate 108, and the batteries 20 are bonded to the fixing plate 114 of the lower case 100 by using the adhesive 40. In addition, to implement better cooling or heating, a fluid passage (not shown in the figure) may be provided in the fixing plate 114, and the fluid passage contains a heat transfer fluid.

In the battery box in this application, there are no special requirements for a type of the batteries 20. The batteries 20 may be hard shell batteries or soft package batteries.

Figure 6:
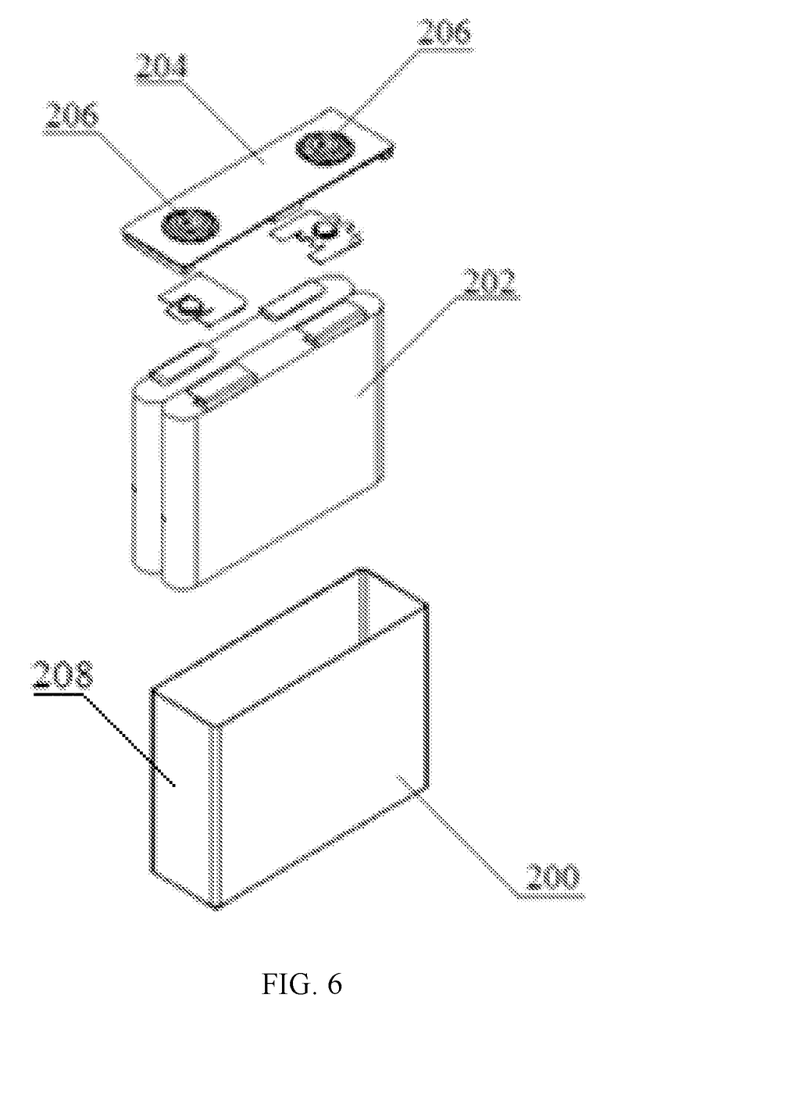
FIG. 6 is a three-dimensional schematic exploded view of a hard shell battery in a battery box according to this application.

Referring to FIG. 6, according to an implementation of this application, a battery 20 is a hard shell battery. The hard shell battery includes a battery housing 200, an electrode assembly 202, and a battery top cover 204. The electrode assembly 202 is accommodated in the battery housing 200, the battery top cover 204 is hermetically connected to the battery housing 200, electrode terminals 206 are disposed on the battery top cover, and the electrode terminals 206 are electrically connected to the electrode assembly 202.

Figure 7A:
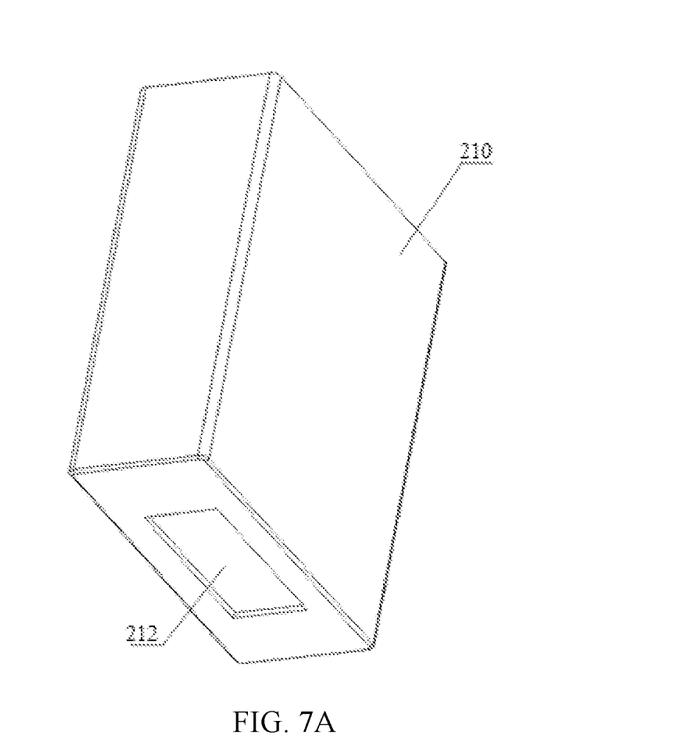
FIG. 7A and FIG. 7B are different schematic structural diagrams of an insulation film wrapped on a surface of the hard shell battery shown in FIG. 6.
Figure 7B:
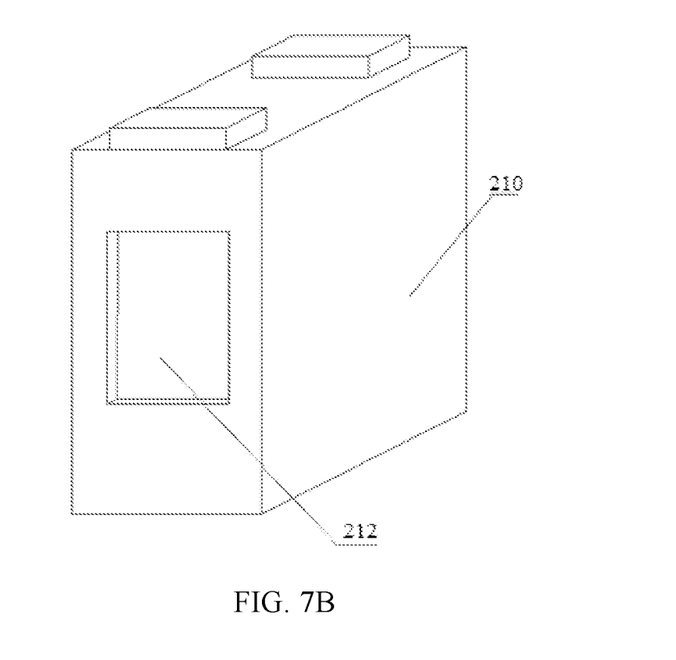

Referring to FIG. 7A and FIG. 7B, to further ensure safety performance of the battery box, the battery housing is made of a metal material, and an outer surface of the battery housing 200 is wrapped with an insulation film 210 (such as a PET film). The outer surface of the battery housing 200 includes a first surface 208, an opening 212 is provided in the insulation film 210, and at least a portion of the first surface 208 is exposed from the insulation film 210 through the opening 212 and bonded to an inner wall (a base plate 106 or a side plate 108) of the battery case 10 by using the adhesive 40. Disposition of the opening 212 is intended to expose partial metal to increase an adhesion strength of the hard shell battery. According to an exemplary implementation of this application, an area of the opening 212 of the insulation film 210 is A1, an area of the first surface 208 is A2, and a ratio of A1 to A2 meets: 30%≤A1/A2≤80%.

It can be understood that according to another implementation of this application, the battery housing 200 is made of a metal material, and the outer surface of the battery housing 200 is coated with an insulation coating or coated with an insulation layer (such as epoxy resin).

Figure 8:
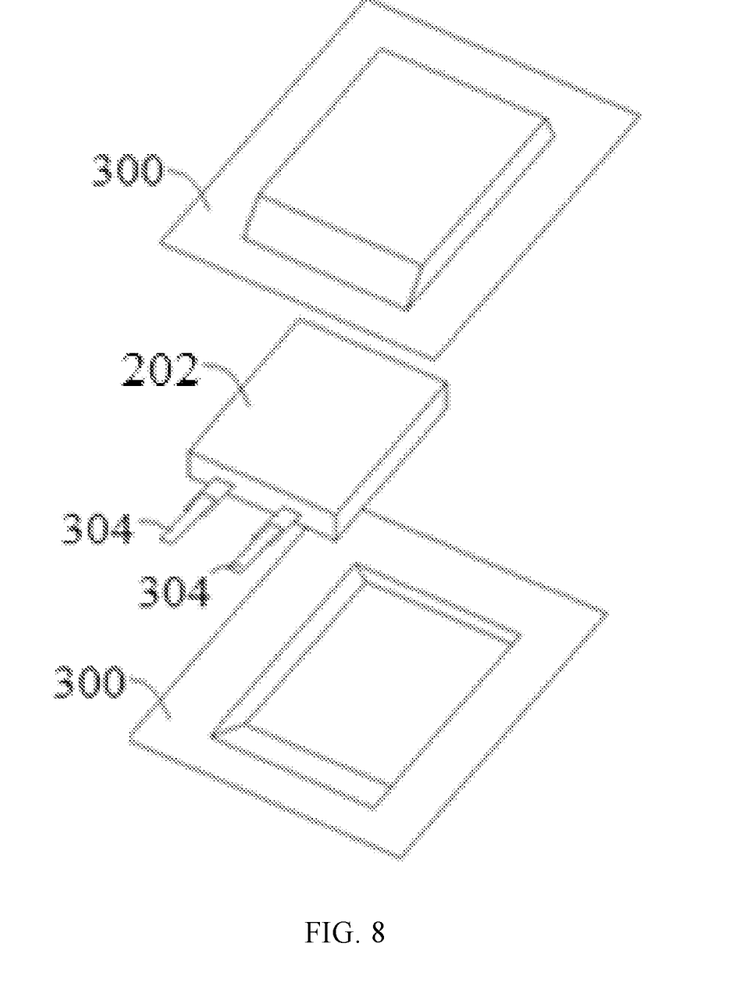
FIG. 8 is a three-dimensional schematic exploded view of a soft package battery in a battery box according to this application.

Referring to FIG. 8, according to another implementation of this application, a battery 20 is a soft package battery. The soft package battery includes a package film 300, an electrode assembly 202, and an electrode lead 304. The electrode assembly 202 is packaged in the package film 300, and the electrode lead 304 is electrically connected to the electrode assembly 202 and extends from the package film 300.

The following further describes in detail the battery box in this application with reference to comparative examples, embodiments, and corresponding test results.

1. Test on the coefficient of thermal conductivity:

(1) Conduct a test on the coefficient of thermal conductivity in accordance with ASTM D5470 by using a test device Hot disk 2550s; set test parameters according to a test method of the device and set an interval of continuous tests to 5 min.

(2) Sample preparation: During sample preparation, confirm that percentages of components A and B are correct (without color difference). During adhesive mixing, use an adhesive gun and a static dispensing head to apply the adhesive to avoid residual bubbles, or mix the adhesive manually and then use a vacuum machine to perform mixing and vacuum for 2 min. Pour the adhesive into a hard-block fabrication fixture, and make the adhesive flow as evenly as possible, where a diameter or a side length of a test block is no less than 36 mm, and a thickness is no less than 6 mm.

(3) Curing condition: Bake the sample in an oven (a specific curing temperature and duration is subject to MS), take the sample out and place the sample at a room temperature for more than two hours, and then start testing.

(4) Test requirements: Use hot disk 2550s to test five parallel samples and obtain an intermediate value.

2. Test on the coefficient of thermal expansion:

(1) Prepare a sample in accordance with GB/T 1036, and use a caliper to measure two state-adjusted samples at an accuracy of up to 0.02 mm.

(2) Adhere an iron sheet to a bottom of the sample to prevent shrinking and measure a length of the sample again.

(3) Use a same dilatometer for each sample, and carefully place the samples in an environment (−32° C. to −28° C.); if a liquid bath is used, make sure that the sample is at least 50 mm below a liquid level. Keep a temperature of the liquid bath at −32° C. to −28° C.; wait until a temperature of the sample is identical to the temperature of the constant-temperature bath and readings of the measuring instrument remain stable for 5 min; and record the temperature and reading.

(4) Carefully put a quartz dilatometer in an environment of +30° C., not to cause vibration. If the liquid bath is used, make sure that the sample is at least 50 mm below the liquid level; keep the liquid bath at a temperature 28° C. to 32° C. of the constant-temperature bath; wait until a temperature of the sample is identical to the temperature of the constant-temperature bath and readings of the measuring instrument remain stable; and record data.

(5) Obtain a result through division of the data.

3. Test on a shear strength of an adhesive:

(1) Size: Prepare a shear sample in accordance with GB/T 7124; use a fixture to accurately position a bonded assembly, use a Teflon tape to limit an adhesive application width, and control a bonding surface length within 12.5±0.5 mm. Unless otherwise specified, a thickness of an adhesive layer is designed to be 0.25±0.05 mm, which can be controlled by inserting an interval lead. The lead is parallel to a force applying direction.

(2) Substrate: The sample may be a substrate of electrophoretic steel, 3003 aluminum (A1), 6063 A1, PET blue film, or the like. A surface of a bonded object shall be free of pollutants such as oil. If there is any pollutant, the pollutant needs to be cleared before bonding. Surface energy of the blue film is required to be 28 dyn to 32 dyn, and surface energy of an aluminum substrate is required to be 30 dyn to 34 dyn. Surfaces of A1 substrates are not specially processed (an aluminum sheet with a coating for oxidation resistance needs to be exposed to air for more than three days before use). A PET blue film is wrapped on an A1 sheet with no air bubble allowed.

(3) Requirements on adhesive mixing: During sample preparation, confirm that percentages of components A and B are correct (without color difference). During adhesive mixing, use an adhesive gun and a static dispensing head to apply the adhesive to avoid residual bubbles, or mix the adhesive manually and then use a vacuum machine to perform mixing and vacuum for 2 min before making a sample.

(4) Preparation process: Bond the sample within a specified operation time. It should be noted that overflowing adhesives need to be removed. Bake the bonded sample in an oven (a specific curing temperature and duration is subject to MS), take the sample out and place the sample at a room temperature for more than two hours, and then start testing.

(5) Test requirements: Use a tensile test machine to conduct testing at a constant test speed of 5 mm/min. To make a force applying direction of the sample parallel to a bonded surface, place a spacer as thick as the sample separately at upper and lower test chucks. If a test on tensile pull displacement needs to be conducted, use an extensometer for measurement.

4. Maximum temperature of a battery:

Dispose a temperature sensor on a top cover of a battery to monitor a temperature of the battery in real time and read data during operation of the battery.

It should be noted that based on an actual requirement, a shear strength needs to be defined to be ≥8 MPa, and the maximum temperature of the battery to be ≤50° C.

The following describes in detail an adhesive composition, testing of related parameters, and performance test results for the battery box in this application with reference to embodiments and comparative examples.

TABLE 1

Adhesive composition, testing of related parameters, and performance test results
for Embodiments 1 to 21 and Comparative examples 1 to 9 in this application

| | Substrate | Filler | Particle size of filler | Thickness of adhesive layer | Coefficient of thermal expansion (α) | Coefficient of thermal conductivity (β) | Ratio | Shear strength | Maximum temperature of battery | Test result |
|---|---|---|---|---|---|---|---|---|---|---|
| Embodiment 1 | 40% polyurethane | 50% aluminum oxide | 10 μm | 0.5 mm | 30 ppm/° C. (25° C.) | 0.8 | 37.5 | 8.5 MPa | 45° C. | Pass |
| Embodiment 2 | 40% polyurethane | 50% aluminum oxide | 50 μm | 1 mm | 30 ppm/° C. (25° C.) | 0.8 | 37.5 | 8.5 MPa | 45° C. | Pass |
| Embodiment 3 | 50% polyurethane | 40% aluminum oxide | 80 μm | 1.5 mm | 35 ppm/° C. (25° C.) | 0.6 | 58.33 | 10.1 MPa | 48° C. | Pass |
| Embodiment 4 | 40% acrylic acid | 50% aluminum oxide | 10 μm | 0.5 mm | 32 ppm/° C. (25° C.) | 0.8 | 40 | 10.5 MPa | 45° C. | Pass |
| Embodiment 5 | 40% acrylic acid | 50% aluminum oxide | 50 μm | 1 mm | 32 ppm/° C. (25° C.) | 0.8 | 40 | 10.5 MPa | 45° C. | Pass |
| Embodiment 6 | 50% acrylic acid | 40% aluminum oxide | 80 μm | 1.5 mm | 40 ppm/° C. (25° C.) | 0.6 | 66.66 | 11.5 MPa | 48° C. | Pass |
| Embodiment 7 | 40% epoxy resin | 50% aluminum oxide | 10 μm | 0.5 mm | 35 ppm/° C. (25° C.) | 0.8 | 43.75 | 9.5 MPa | 45° C. | Pass |
| Embodiment 8 | 40% epoxy resin | 50% aluminum oxide | 50 μm | 1 mm | 35 ppm/° C. (25° C.) | 0.8 | 43.75 | 9.5 MPa | 45° C. | Pass |
| Embodiment 9 | 50% epoxy resin | 40% aluminum oxide | 80 μm | 1.5 mm | 45 ppm/° C. (25° C.) | 0.6 | 75 | 10.1 MPa | 48° C. | Pass |
| Embodiment 10 | 40% polyurethane | 50% boron nitride | 10 μm | 0.5 mm | 30 ppm/° C. (25° C.) | 1.6 | 18.75 | 8.5 MPa | 40° C. | Pass |
| Embodiment 11 | 40% polyurethane | 50% boron nitride | 50 μm | 1 mm | 30 ppm/° C. (25° C.) | 1.6 | 18.75 | 8.5 MPa | 40° C. | Pass |
| Embodiment 12 | 50% polyurethane | 40% boron nitride | 80 μm | 1.5 mm | 35 ppm/° C. (25° C.) | 1.2 | 29.17 | 10.1 MPa | 45° C. | Pass |
| Embodiment 13 | 60% polyurethane | 30% boron nitride | 80 μm | 1.5 mm | 40 ppm/° C. (25° C.) | 0.8 | 50 | 11 MPa | 48° C. | Pass |
| Embodiment 14 | 40% acrylic acid | 50% boron nitride | 10 μm | 0.5 mm | 32 ppm/° C. (25° C.) | 1.9 | 16.84 | 10.5 MPa | 40° C. | Pass |
| Embodiment 15 | 40% acrylic acid | 50% boron nitride | 50 μm | 1 mm | 32 ppm/° C. (25° C.) | 1.9 | 16.84 | 10.5 MPa | 40° C. | Pass |
| Embodiment 16 | 50% acrylic acid | 40% boron nitride | 80 μm | 1.5 mm | 40 ppm/° C. (25° C.) | 1.5 | 26.67 | 11.5 MPa | 45° C. | Pass |
| Embodiment 17 | 60% acrylic acid | 30% boron nitride | 80 μm | 1.5 mm | 55 ppm/° C. (25° C.) | 1.2 | 45.8 | 12.5 MPa | 48° C. | Pass |
| Embodiment 18 | 40% epoxy resin | 50% boron nitride | 10 μm | 0.5 mm | 35 ppm/° C. (25° C.) | 1.6 | 21.88 | 9.5 MPa | 40° C. | Pass |
| Embodiment 19 | 40% epoxy resin | 50% boron nitride | 50 μm | 1 mm | 35 ppm/° C. (25° C.) | 1.6 | 21.88 | 9.5 MPa | 40° C. | Pass |
| Embodiment 20 | 50% epoxy resin | 40% boron nitride | 80 μm | 1.5 mm | 45 ppm/° C. (25° C.) | 1 | 45 | 10.1 MPa | 45° C. | Pass |
| Embodiment 21 | 60% epoxy resin | 30% boron nitride | 80 μm | 1.5 mm | 55 ppm/° C. (25° C.) | 0.7 | 78.57 | 11 MPa | 48° C. | Pass |
| Comparative example 1 | 30% polyurethane | 60% aluminum oxide | 10 μm | 0.5 mm | 12 ppm/° C. (25° C.) | 1 | 12 | 6.5 MPa | 40° C. | Fail |
| Comparative example 2 | 60% polyurethane | 30% aluminum oxide | 80 μm | 1.5 mm | 40 ppm/° C. (25° C.) | 0.4 | 100 | 11 MPa | 55° C. | Fail |
| Comparative example 3 | 30% acrylic acid | 60% aluminum oxide | 10 μm | 0.5 mm | 10 ppm/° C. (25° C.) | 1.1 | 9.09 | 7 MPa | 40° C. | Fail |

TABLE 1-continued

Adhesive composition, testing of related parameters, and performance test results
for Embodiments 1 to 21 and Comparative examples 1 to 9 in this application

| | Substrate | Filler | Particle size of filler | Thickness of adhesive layer | Coefficient of thermal expansion (α) | Coefficient of thermal conductivity (β) | Ratio | Shear strength | Maximum temperature of battery | Test result |
|---|---|---|---|---|---|---|---|---|---|---|
| Comparative example 4 | 60% acrylic acid | 30% aluminum oxide | 80 μm | 1.5 mm | 55 ppm/° C. (25° C.) | 0.5 | 110 | 12.5 MPa | 55° C. | Fail |
| Comparative example 5 | 30% epoxy resin | 60% aluminum oxide | 10 μm | 0.5 mm | 14 ppm/° C. (25° C.) | 1 | 14 | 7.5 MPa | 40° C. | Fail |
| Comparative example 6 | 60% epoxy resin | 30% aluminum oxide | 80 μm | 1.5 mm | 55 ppm/° C. (25° C.) | 0.4 | 137.5 | 11 MPa | 55° C. | Fail |
| Comparative example 7 | 30% polyurethane | 60% boron nitride | 10 μm | 0.5 mm | 20 ppm/° C. (25° C.) | 2 | 10 | 6.5 MPa | 35° C. | Fail |
| Comparative example 8 | 30% acrylic acid | 60% boron nitride | 10 μm | 0.5 mm | 25 ppm/° C. (25° C.) | 2.2 | 11.36 | 7 MPa | 35° C. | Fail |
| Comparative example 9 | 30% epoxy resin | 60% boron nitride | 10 μm | 0.5 mm | 22 ppm/° C. (25° C.) | 2 | 11 | 7.5 MPa | 35° C. | Fail |

It can be learned from the embodiments in this application and the test results shown in Table 1 that in the battery box in this application, the battery case and the plurality of batteries accommodated in the battery case are bonded by using the adhesive, and the adhesive contains the substrate and filler. A large coefficient of thermal conductivity of the adhesive indicates a high content of the filler in the adhesive and correspondingly a low content of the substrate. In this case, although heat conduction performance is good, the adhesive cracks or peels under heat stress due to alternating temperatures during use of the battery box. A large coefficient of thermal expansion of the adhesive indicates a high content of the substrate in the adhesive and correspondingly a low content of the filler. In this case, although thermal expansion performance is good, heat conduction requirements of the battery box can hardly be met. In the battery box in this application, when the coefficient of thermal conductivity of the adhesive matches the coefficient of thermal expansion, heat conduction requirements of the battery box can be satisfied, and the adhesive can also be prevented from cracking or peeling off under heat stress due to alternating temperatures during use of the battery box, thereby improving safety performance of the battery box.

This application further provides an apparatus, including the battery box provided in any one of the foregoing embodiments, and the battery box is configured to supply electric energy. The apparatus may be an apparatus that uses a battery box, for example, a vehicle (in particular, an electric vehicle), a steamer, or an aircraft, and the battery box supplies electric energy to the apparatus.

Based on the disclosure and instructions in the specification, a person skilled in the art may further make appropriate modifications and changes to the foregoing implementations. Therefore, this application is not limited to the specific implementations disclosed and described above. Some changes and modifications to this application shall also fall within the protection scope of the claims of this application. In addition, although certain terms are used in the specification, these terms are merely used for ease of description and do not constitute any limitation on this application.

What is claimed is:

1. A battery box, comprising a battery case and a plurality of batteries accommodated in the battery case, wherein the batteries are bonded to an inner wall of the battery case by using an adhesive, a coefficient of thermal expansion of the adhesive is α in units of ppm/° C., a coefficient of thermal conductivity of the adhesive is β in units of W/mK, and a ratio of α and β meets a relation of $1.5 \leq \alpha/\beta \leq 80$, wherein each battery comprises a battery housing and an insulation layer, the battery housing has an outer surface, the outer surface further comprises a first surface on a side of the battery housing, the insulation layer is disposed on the outer surface and has an opening, at least a portion of the first surface is exposed from the insulation layer through the opening and bonded to the inner wall of the battery case by using the adhesive, and the opening is smaller than the first surface in size.

2. The battery box according to claim 1, wherein the ratio of the coefficient of thermal expansion α and the coefficient of thermal conductivity β of the adhesive meets a relation of $25 \leq \alpha/\beta \leq 45$, wherein the coefficient of thermal expansion α is in units of ppm/° C. and the coefficient of thermal conductivity β is in units of W/mK.

3. The battery box according to claim 1, wherein the coefficient of thermal expansion α of the adhesive is 30 ppm/° C. to 55 ppm/° C.; and the coefficient of thermal conductivity β of the adhesive is 0.6 W/mK to 1.9 W/mK.

4. The battery box according to claim 1, wherein the adhesive comprises a substrate and a filler.

5. The battery box according to claim 4, wherein the substrate is selected from the group consisting of polyurethane, acrylic acid, and epoxy resin, or any combination thereof; a percentage of the substrate in the adhesive by weight is 30% to 90%; the filler is aluminum oxide or boron nitride, and a percentage of the filler in the adhesive by weight is 10% to 70%.

6. The battery box according to claim 4, wherein a particle size of the filler is 10 micrometers to 80 micrometers.

7. The battery box according to claim 1, wherein a thickness of the adhesive is 0.5 millimeters to 1.5 millimeters.

8. The battery box according to claim 1, wherein an electrode assembly is accommodated in the battery housing, a battery top cover is hermetically connected to the battery housing, an electrode terminal is disposed on the battery top cover, and an electrode terminal is electrically connected to the electrode assembly.

9. The battery box according to claim 8, wherein the battery housing is made of a metal material, and the insulation layer is an insulation film wrapping the outer surface.

10. The battery box according to claim 1, wherein an area of the opening of the insulation layer is A1, an area of the first surface is A2, and a ratio of A1 to A2 meets 30%≤A1/A2≤80%.

11. The battery box according to claim 8, wherein the battery housing is made of a metal material, and the insulation layer is an insulation coating coated onto the outer surface.

12. The battery box according to claim 1, wherein the battery case comprises a lower case and a box cover that is hermetically connected to the lower case; and the batteries are bonded to an inner wall of the lower case by using the adhesive, and/or the batteries are bonded to an inner wall of the box cover by using the adhesive.

13. The battery box according to claim 12, wherein the lower case comprises a base plate and a side plate that encloses a periphery of the base plate, and the batteries are bonded to the base plate of the lower case by using the adhesive.

14. The battery box according to claim 13, wherein the lower case further comprises a fixing plate, the fixing plate is fixedly connected to the base plate or the side plate, and the batteries are bonded to the fixing plate of the lower case by using the adhesive.

15. The battery box according to claim 14, wherein a fluid passage is provided in the fixing plate, and the fluid passage contains a heat transfer fluid.

16. The battery box according to claim 12, wherein the box cover comprises a top plate and a surrounding plate that encloses a periphery of the top plate, and the batteries are bonded to the top plate of the box cover by using the adhesive.

17. An apparatus, comprising a battery box configured to supply electric energy to the apparatus, the battery box comprising a battery case and a plurality of batteries accommodated in the battery case, wherein the batteries are bonded to an inner wall of the battery case by using an adhesive, a coefficient of thermal expansion of the adhesive is $\alpha$ in units of ppm/° C., a coefficient of thermal conductivity of the adhesive is $\beta$ in units of W/mK, and a ratio of $\alpha$ and $\beta$ meets a relation of $1.5 \leq \alpha/\beta 80$, wherein each battery comprises a battery housing and an insulating insulation layer, the battery housing has an outer surface, the outer surface further comprises a first surface on a side of the battery housing, the insulation layer is disposed on the outer surface and has an opening, at least a portion of the first surface is exposed from the insulation layer through the opening and bonded to the inner wall of the battery case by using the adhesive, and the opening is smaller than the first surface in size.

* * * * *